United States Patent [19]

Byrne et al.

[11] 4,442,602

[45] Apr. 17, 1984

[54] HORN AND BONE CUTTING DEVICE

[75] Inventors: Richard F. Byrne, Cromer; Samuel E. Pierce, Calga, both of Australia

[73] Assignee: Jarvis A. N. Z. Pty. Limited, New South Wales, Australia

[21] Appl. No.: 278,693

[22] Filed: Jun. 29, 1981

[30] Foreign Application Priority Data

Nov. 14, 1980 [AU] Australia .............................. 64408/80

[51] Int. Cl.³ .............................................. B26B 17/00
[52] U.S. Cl. ........................................ 30/180; 17/1 R
[58] Field of Search .................... 17/1 R; 30/180, 188, 30/240; 144/2 N

[56] References Cited

U.S. PATENT DOCUMENTS 3,562,906 2/1971 Edwards et al. ...................... 30/180

FOREIGN PATENT DOCUMENTS 373538 4/1923 Fed. Rep. of Germany ........ 30/180

Primary Examiner—Willie G. Abercrombie
Attorney, Agent, or Firm—Pearne, Gordon, Sessions, McCoy, Granger & Tilberry

[57] ABSTRACT

A hydraulically driven device for cutting the horn or bones of animals such as cattle or sheep is provided. The device has a pair of opposing cutting edges which move in an arcuate path to meet at a common intersection to provide a cutting action.

4 Claims, 4 Drawing Figures

HORN AND BONE CUTTING DEVICE

This invention relates to a device for cutting horns from the heads of animals, or cutting bones such as the leg bones of cattle.

The modern practice of slaughtering and recovering the meat from beasts, such as steers, in abattoirs involves firstly killing the animal by suitable means such as an electric shock and then hanging the animal from one of its rear hoofs or legs, or horizontally on a shaft. It is then necessary to remove the hide from the carcass and as the hide is recovered for further processing it is desirable to recover the hide without ripping and, for efficiency, it must be recovered in the easiest possible manner. Thus, where the animal has horns the horns must first be cut, preferably below the level of the hide so that when the hide is peeled back over the head of the animal it will not catch on the horns.

Furthermore, as the hide from the legs is only removed from the knees upwards, it is essential to cut the legs of the animal above or below the knee at a suitable point. The hide is split along a suitable side of the animal, either on the back or the stomach and is then peeled off the carcass.

The current methods of cutting the horns and the legs involve mechanical devices which are effectively large scissor-type cutters. The problem with such devices is that they cannot cut below the skin of the animal in a satisfactory manner. Furthermore, they are generally unsatisfactory, bulky and ineffective.

It is the object of this invention to provide an improved form of horn and bone cutter.

In its broadest form the invention provides a horn cutter comprising a pair of opposing cutting edges movable in an arcuate path in such a manner that they meet together at a common intersection and are adapted to move apart retracing said arcuate path, and wherein said cutters are driven by means of a rotatable hydraulic driving means.

By creating a cutter whereby the two cutting edges meet together instead of in a scissors movement as with most of the prior art, it is possible to cut the horns below the skin level and actually break them from the skull of the animal. This ensures that no stumps of the horns remain so that the skin can be pulled from the head of the animal without catching on any protruding horn parts.

The use of a rotatable hydraulic drive cylinder arrangement provides an extremely high pressure which translated to the cutter blades provides a very efficient cut-off mechanism.

The invention will now be described by way of example only with reference to the accompanying drawings, wherein.

Figure 1:
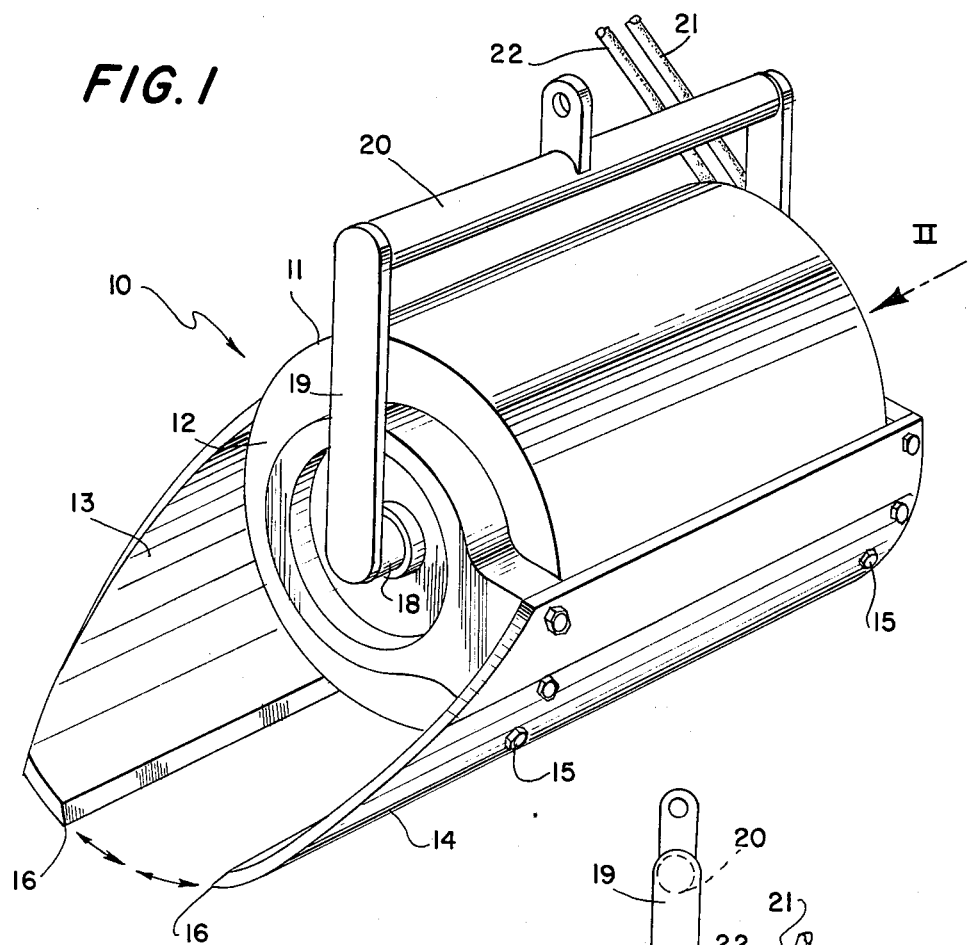
FIG. 1 is a perspective view of a preferred form of the cutters.
Figure 2:
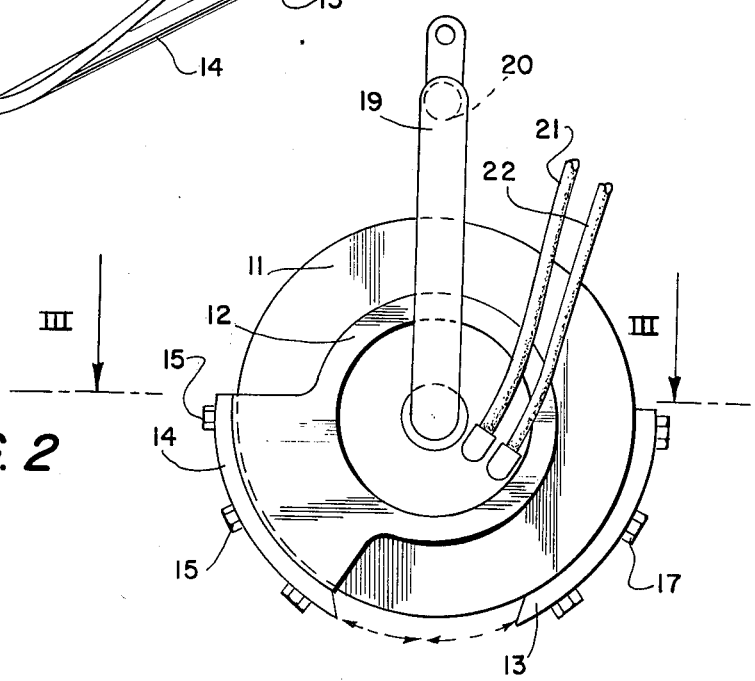
FIG. 2 is an end view in the direction II—II of FIG. 1.
Figure 4:
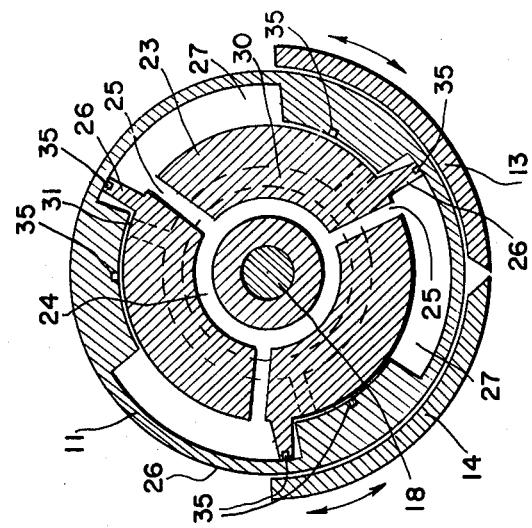
FIG. 4 is a view of the section IV—IV of FIG. 3.
Figure 3:
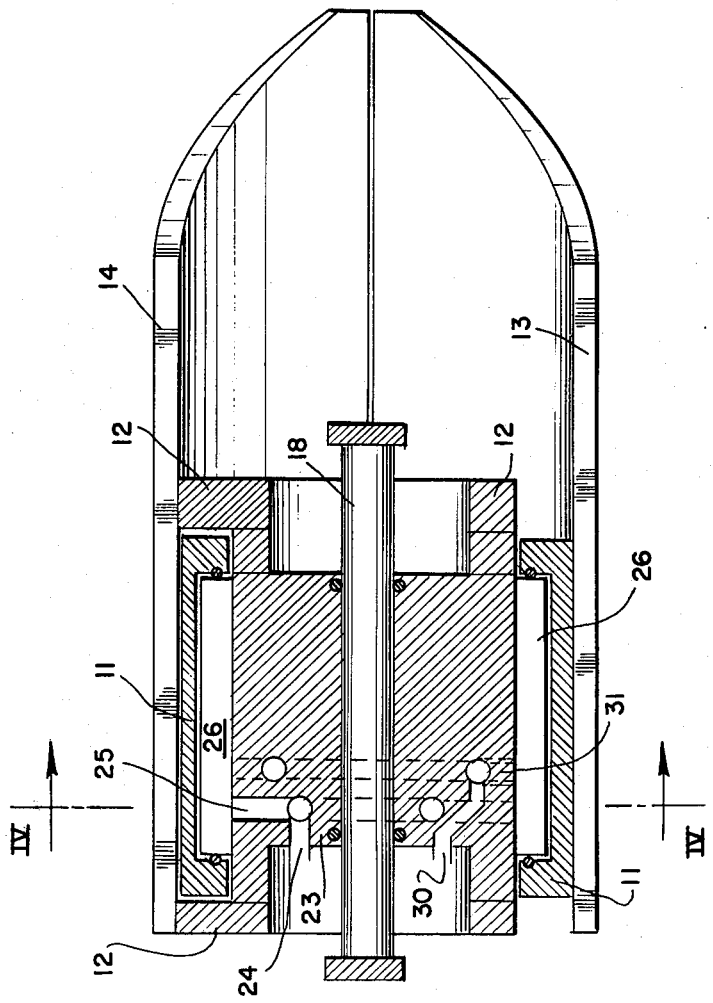
FIG. 3 is a sectional view through III—III of FIG. 2.

The cutter apparatus 10 comprises two cutting blades 13 and 14 having cutting edges 16. As shown in FIGS. 2 and 4 the two cutting edges 16 come together at a common intersection. The cutting edges preferably are chamfered as shown in the drawings to assist cutting and a "downwards" pull on the cutter.

The cutting blades 13 and 14 are attached to respective mounting and drive means which enables them to be driven through their arcuate paths to provide a deep cutting action. The drive means comprises a dual concentric cylinder arrangement wherein an outer cylinder 11 has attached thereto the cutting blade 13 by means of bolts 17 and an inner cylinder 23 which is rotatable with respect to outer cylinder 11. The inner cylinder 23 has a pair of outer arms 12 to which the second cutting blade 14 is bolted 15.

The outer cylinder 11 comprises at least one and preferably three receptor means 27. The receptor means 27 receive paddles 26 extending radially outwardly from the inner cylinder 23. The inner cylinder may thus rotate in a reciprocal manner within the outer cylinder by an amount equal to the length of travel of the paddles 26 within the receptors 27. By suitable hydraulic fluid manifold channelling means 24, 25, 30 and 31 it is possible to inject or remove hydraulic fluid from one side or the other of paddles 26, thus causing a pressure gradient across the paddle to drive it one direction or the other. Hydraulic lines 21 and 22 supply or withdraw such hydraulic fluid from the entrance ports 24 and 30. Thus it is possible to utilise hydraulic fluid to rotate the cylinders 23 and 11 relative to each other and thus, in turn, drive the blades 13 and 14 at a very high pressure towards each other to provide the necessary cutting action.

A central shaft 18 may be arranged so that it is fixed or rotatable with regard to the inner cylinder 23. The shaft 18 is then attached to handle 20 by means of linkages 19. Handle 20 includes a lug which may be attached by means of a wire (not shown) to an overhead carrying device. The overhead carrying device would thus help to carry the weight of the unit so that the operator may be relieved of part of the weight of the unit and may prevent the unit from reaching the ground thus reducing the chances of the machine getting dirty.

Suitable seals 35 are incorporated in the unit to prevent the leakage of hydraulic fluid between the receptor cavities 27 and the inner cylinder 23.

A suitable switching device would also be provided to actuate hydraulic fluid through the relevant fluid lines to open or close the cutting means.

Preferably the apparatus is made of a suitable material for food processing plants such as stainless steel, so that it may be readily sterilised.

What we claim is:

1. A horn or bone cutter comprising a rotary hydraulic driving means; and a pair of cutting blades, each including a cutting edge, said blades extending from said driving means and being driven by said driving means reciprocatably about an arcuate path with unlimited access on each side of each blade and an open end therebetween so that said cutting edges may be introduced transversely of the bone or horn to the cutting position thereof.

2. The cutter of claim 1, wherein the hydraulic driving means comprises a pair of concentric cylindrical members arranged in a manner such that said members are partly rotatable relative to each other to form a hydraulic motor.

3. The cutter of claim 2, wherein the hydraulic motor comprises at least one flange type paddle extending from one of said cylindrical members, each at least one paddle being located and adapted to reciprocate within a respective sealed receptor cavity located within said other of said cylindrical members, and means to selectively direct hydraulic fluid to either one or the other side of each said at least one paddle to cause movement thereof within said receptor cavity.

4. The cutter of claim 1 or 2 wherein there is a central shaft passing through said inner cylinder and having handle means attached thereto.

* * * * *